3,849,342
Patented Nov. 19, 1974

3,849,342
CATALYSTS FOR CONVERSION OF NITROGEN OXIDE POLLUTANTS IN AUTOMOTIVE EXHAUST GASES
Teuvo Santala, Attleboro, Mass., assignor to Texas Instruments Incorporated, Dallas, Tex.
Filed Nov. 29, 1972, Ser. No. 310,623
Int. Cl. B01j 11/22
U.S. Cl. 252—462    3 Claims

ABSTRACT OF THE DISCLOSURE

Improved metal catalysts particularly adapted for use in dual-bed catalytic converters for converting the nitrogen oxide pollutants in automotive exhaust gasses to harmless gasses are shown to comprise metal alloys which combine nickel and copper alloy constituents with additives of certain metal catalysts such as vanadium, the improved catalyst materials being arranged so that automotive exhaust gasses are passed over the catalysts under reducing conditions at relatively low temperatures so that the catalysts are effective to reduce nitrogen oxides in the exhaust while minimizing ammonia formation by the catalysts even at low temperatures and even where the exhaust gasses have very low free oxygen concentrations and so that the catalyst materials, supported on metal backing layers, display remarkably improved service lives.

---

It has been known that certain environmental pollutants such as nitrogen oxides, carbon monoxide and various unburned hydrocarbons can be removed from automotive exhaust gasses by placing a dual-bed catalytic converter close to the exhaust manifold of an automobile engine so that exhaust gasses from the engine are passed through the catalytic converter while the exhaust gasses are still very hot, the first catalyst bed in the catalytic converter being formed of a nickel-copper alloy for reducing the nitrogen oxides in the exhaust and the second catalyst bed being formed of a platinum mesh or the like for oxidizing the carbon monoxide and hydrocarbon constituents of the exhaust. Where this previously known dual-bed converter is used, the customary, slightly rich fuel-air mixture is supplied to the engine so that the exhaust from the engine provides reducing conditions in the first, nickel-copper catalyst bed of the converter and thereby avoids such extensive oxidizing of the nickel-copper catalyst as would tend to rapidly deactivate the catalyst. Exhaust gasses passed through the first bed of this known converter are then mixed with air to provide oxidizing conditions as the exhaust is passed into the second, platinum catalyst bed of the converter.

In this previously known use of the dual-bed catalytic converter, it is found that the nickel-copper catalyst does not tend to be poisoned by sulfur and other constituents of the exhaust gasses. However, it is found that the exhaust gasses must be very hot as the gasses are passed over the nickel-copper catalyst if the converter is to achieve a suitable degree of efficiency in removing nitrogen oxides from the exhaust. That is, when the exhaust gasses are passed over the known nickel-copper catalyst at relatively low temperatures, particularly where the exhaust has a low free oxygen concentration, it is found that a substantial proportion of the nitrogen oxides reduced by the nickel-copper catalyst are converted to ammonia gas. This ammonia gas is then reconverted to nitrogen oxide as the exhaust is passed through the second, oxidizing catalyst bed of the known converter with the result that the exhaust still has a very significant nitrogen oxide content as it is discharged from the converter. Only where the exhaust gasses are very hot in passing over the nickel-copper catalyst is the known catalyst sufficiently effective and also able to produce a sufficiently low proportion of ammonia so that the exhaust ultimately discharged from the dual-bed converter has a suitably low nitrogen oxide content.

Unfortunately, where the known nickel-copper catalyst is exposed to such very hot exhaust gasses, the catalyst material is found to have a very short service life. That is, where the nickel-copper catalyst is used in the form of unsupported metal elements packed together with a selected density in the first catalyst bed of the known converter, the high temperatures to which the elements are exposed causes the metal elements to a glomerate to build up back pressures in the converter and to obstruct exhaust gas flow through the converter. On the other hand, where the nickel-copper catalyst is supported on backing layers of metals selected to be resistant to such high temperatures, diffusion occurring between the nickel-copper catalyst and the backing layer material at such high temperatures also causes rapid deterioration of the composite material system embodying the known catalyst.

It is an object of this invention to provide novel and improved metal catalysts for removing nitrogen oxides from automotive exhaust gasses; to provide such catalysts which are of simple and inexpensive construction. lyst on a dual-bed catalytic converter; to provide such improved catalysts which are operable with high net efficiencies at relatively low exhaust gas temperatures; to provide processes for using such improved catalysts at relatively low exhaust gas temperatures; to provide such improved catalysts which display remarkably improved service lives; and to provide such improved catalysts which are of simple and inexpensive construction.

Briefly described, the novel and improved metal catalyst which is provided by this invention for converting nitrogen oxide pollutants in automotive exhaust gasses to harmless gasses is shown to comprise a metal alloy which specifically combines nickel and copper alloy constituents with additives of certain metal catalysts selected from the metals of Groups III-B, IV-B, V-B, VI-B and VII-B of the Periodic System, the nickel constituent of this improved catalyst being used to assure substantially complete reduction of nitrogen oxides in the exhaust gasses as the exhaust gasses are passed over the improved catalyst under reducing conditions. Such an additive could comprise vanadium. In this improved catalyst, the vanadium or other metal catalyst additive serves to minimize ammonia formation in the exhaust as the exhaust gasses are passed over the improved catalyst. As result, the exhaust gasses which have been passed over the improved catalysts are then adapted to be passed through an oxidizing, platinum catalyst bed or the like in a dual-bed catalytic converter without any significant degree of reconversion of exhaust constituents to reform nitrogen oxides in the exhaust, thereby to significantly improve the net efficiency of the catalyst of this invention in removing nitrogen oxides from the exhaust gasses. In the process of this invention, the improved catalyst as above-described is arranged to receive exhaust gasses from an automobile engine at relatively low temperatures on the order of 1300° F. or less so that the improved catalyst material displays a service life which is improved many fold over the service lives of previously known nitrogen oxide reducing catalysts.

Other objects, advantages and details of the novel and improved catalysts and processes of this invention appear in the following detailed description of preferred embodiments of the invention, the detailed description referring to the drawings in which.

Figure 1:
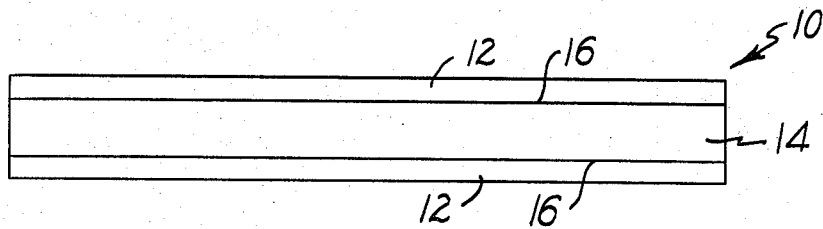
FIG. 1 is a side elevation view of a composite metal laminate material embodying surface layers of the improved catalyst of this invention.

As previously noted, the novel and improved metal catalyst of this invention comprises a metal alloy which specifically combines nickel and copper alloy constituents with an additive of a metal catalyst selected from the metals of Groups III-B (including the rare earths), IV-B, V-B, VI-B and VII-B of the Periodic System, the metal catalyst additive being selected for reducing ammonia formation by the improved catalyst when automotive exhaust gasses are passed over the improved catalyst under reducing conditions at relatively low temperatures even where the exhaust gasses have relatively low free oxygen concentrations. Such an additive could comprise vanadium. Preferably, the improved catalyst alloy embodies between about 25 and 75 percent by weight of nickel. In this regard, nickel has been found to be effective in reducing substantially all nitrogen oxides in automotive exhaust gases under a variety of conditions including variations in temperature between 800° F. and 1800° F. and including variations in free oxygen concentrations in the exhaust gases from 0 percent free oxygen to 1.4 percent free oxygen, by volume. The improved catalyst alloy preferably embodies at least about 25 percent nickel because the effectiveness of the catalyst in reducing nitrogen oxides appears to fall off with lesser proportions of nickel particularly when the exhaust gasses are passed over the catalyst at high velocities. On the other hand, as the effectiveness of the improved catalyst alloy in reducing nitrogen oxides does not appear to increase to any significant degree with nickel contents greater than about 75 percent of the catalyst alloy, use of greater nickel contents is not recommended.

In accordance with this invention, the improved metal catalyst alloy preferably embodies at least about 0.5 percent of the noted metal catalyst additive and may embody as much as 20 percent by weight of the additive, the balance of the improved catalyst alloy then being made up of copper and impurities. Preferably a relatively small proportion on the order of about 1.5 percent by weight of the catalyst additive is used in the improved catalyst alloy and, particularly where the catalyst additive is used in such small proportion, the catalyst additive is selected so that the additive metal resists oxidizing at temperatures well above 1300° F., thereby to assure that the catalyst additive is not deactivated by oxidation if oxidizing conditions should temporarily occur in the automotive exhaust gasses.

Thus, as above-described, the improved metal catalyst of this invention preferably comprises a metal alloy having the composition, by weight, of from about 50 to 75 percent nickel, from about 0.5 to 20 percent of a metal such as vanadium, lanthanum, and didymium (a mixture of neodymium and praseodymium), or selected from the metals of Groups III-B (including the rare earths), IV-B, V-B, VI-B and VII-B of the Periodic System for suppressing ammonia formation, and the balance copper and impurities. Typically, for example, this improved catalyst is formed by the addition of vanadium to a Monel metal base so that the typical catalyst material provided by this invention has a composition, by weight, of about 64.3 percent nickel, 31.4 percent copper, 1.48 percent vanadium, 1.22 percent iron, 1.22 percent manganese and the balance carbon, silicon and other impurities.

Figure 2:
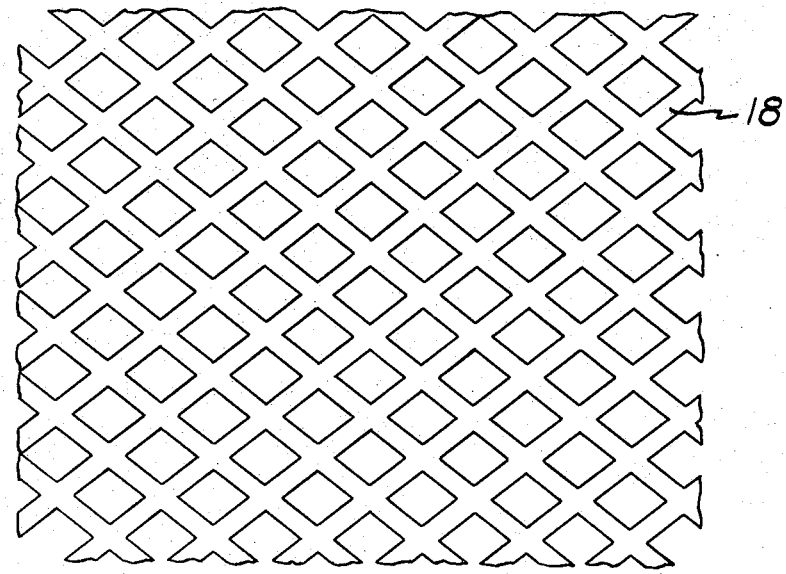
FIG. 2 is a partial plan view of an expanded metal mesh member embodying the improved catalyst material of this invention.

In accordance with this invention this improved catalyst material is preferably clad on both sides of a sheet of backing or supporting metal selected to be resistant to high temperatures on the order of about 1800° F. or more and the resulting composite metal laminate material is expanded in any conventional way to form an expanded metal mesh. Typically, for example, as shown in FIG. 1 sheets 12 of the improved catalyst alloy are pressure-bonded to both sides of a layer 14 of backing metal material having a composition, by weight, of about 80 percent nickel and the balance chromium, the pressure-bonding being accomplished by any conventional roll-bonding techniques or the like for metallurgically bonding the catalyst alloy to the backing material substantially throughout the interfaces 16 to form the composite laminate material 10. Preferably, for example, the composite 10 is provided with a total composite thickness of about 0.003 to 0.006 inches with each of the two layers of catalyst material having a thickness of about 0.0005 to 0.0015 inches. This composite metal sheet material 10 is then expanded in any conventional manner to form an expanded metal mesh member as indicated at 18 in FIG. 2, the mesh preferably having mesh elements about 0.020 inches wide and having about 50–200 mesh openings per square inch. As will be understood, the catalyst alloy layers 12 are also bonded to one or both sides of other metal backing materials such as any of the 300 Series Stainless Steels or the like within the scope of this invention.

In accordance with this invention, the improved catalyst material 12 is preferably activated before use in removing nitrogen oxides for automotive exhaust gasses. Preferably, for example, the mesh material above-described is heated to a temperature in the range from about 1600° F. to 1900° F. for a period of about 1 to 3 hours in air having about 10 to 12 percent by weight of water vapor therein, this pretreatment being provided to enhance the surface porosity of the catalyst layers 12 to increase the effective surface area of the catalyst material. If desired, this treated material is then reduced by heating to a temperature of about 1500° F. for one hour in a reducing atmosphere. Of course, other known pretreatments for enhancing the surface areas of catalyst materials are also used within the scope of this invention.

Figure 3:
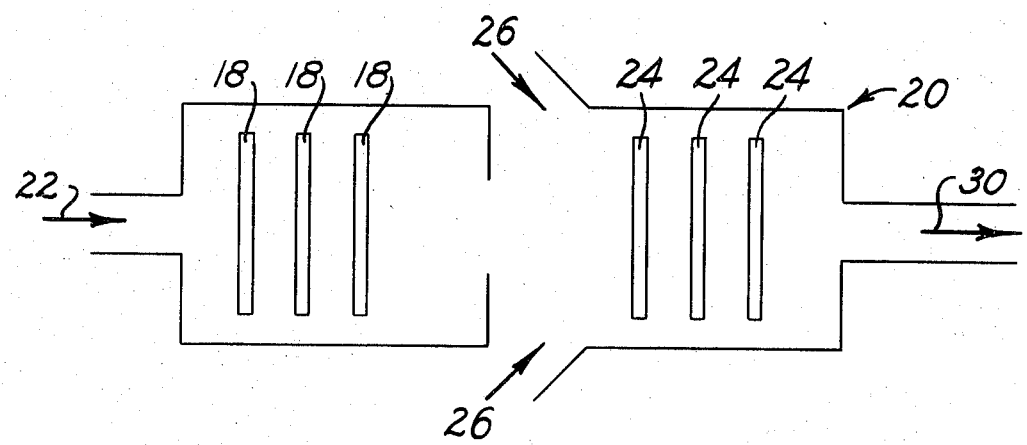
FIG. 3 is a diagrammatic view illustrating use of the improved catalyst material of this invention in the improved process of this invention.

In accordance with the process of this invention, a plurality of the expanded metal mesh members 18 are disposed in a suitable catalytic converter casing as indicated at 20 in FIG. 3 and the converter is arranged so that exhaust gasses from an automobile engine are directed over the catalyst alloy layers of the mesh as indicated by the arrow 22 in FIG. 3, these exhaust gasses preferably being directed over the improved catalyst materials at relatively low temperatures in the range from about 1000° F. to 1300° F. and preferably having low free oxygen concentrations below about 1.4 percent by volume to establish reducing conditions as the exhaust gasses pass over the mesh member 18. Alternately, of course, the mesh material is arranged in a jelly roll or spirally-wrapped sheet configuration disposed with its longitudinal axis parallel to the direction indicated by the arrow 22 in the converter 20. As will be understood, the mesh material 18 is adapted to be placed in a catalytic converter 20 as above-described, wherein the converter also houses oxidizing platinum mesh catalyst members 24 and is adapted to receive air therein as indicated at 26 in FIG. 3. In this arrangement, as in the conventional dual-bed catalytic converter, the converter is adapted to remove nitrogen oxides from the exhaust gasses as the exhaust is passed over the improved catalyst 18 and is adapted to remove carbon monoxide and unburned hydrocarbons from the exhaust gasses as the exhaust is passed over the mesh members 24. As the dual-bed catalytic converter thus described is well known, it is not further described herein and it will be understood that, when automotive exhaust gases are passed over the improved catalyst of this invention as above-described, the exhaust gasses are adapted to be passed through any conventional oxidizing catalyst beds on a dual-bed converter without risk of reformation of nitrogen oxides in the exhaust.

Where the improved catalyst materials of this invention are used in the manner above-described for converting nitrogen oxides in automotive exhaust gasses to harmless gasses, the catalyst materials are found to be substantially free of poisoning by sulfur and other such constituents of the automotive exhaust. The catalyst materials are also found to be effective in reducing nitrogen oxides in the exhaust gasses under a variety of temperature conditions. The improved catalyst materials are also effective in reducing nitrogen oxides in the exhaust gasses as the free oxygen concentration in the exhaust gasses varies from 0 to about 1.4 percent, by volume. Most important, it is found that the improved catalysts are effective to reduce 50 percent or more of the nitrogen oxides in the exhaust gasses at temperatures as low as 1000° F. and are effective to reduce more than 85 percent of the nitrogen oxides in the exhaust at temperatures as low as 1200° F. while assuring that no significant part of these reduced nitrogen oxides are converted into ammonia gas even when the exhaust gasses have 0 percent free oxygen concentration therein. Further, when operated at these low temperatures, the improved catalyst materials display remarkably improved service lives using the improved catalysts supported on metal backing layers. For example, diffusion between the catalyst material and the material of a backing layer supporting the catalyst is as much as one hundred fold less than it would be if the catalyst were operated at a temperature on the order of 1500° F. as in the case of the prior art catalysts.

EXAMPLE I

For example, mesh members 18 as above-described having catalyst layers 12 formed of an alloy having a composition, by weight, of 64.3 percent nickel, 31.4 percent copper, 1.48 percent vanadium, 1.22 percent iron, 1.22 percent manganese and the balance carbon, silicon and other impurities were clad on both sides of a metal backing layer material having a composition, by weight, of 80 percent nickel and 20 percent chromium, the catalyst alloy layers each having a thickness of about 0.0015 inches and the composite material having a total composite thickness of about 0.006 inches. This mesh material was formed by cladding the noted backing layer material with Monel metal, by vapor depositing about 2 milligrams of vanadium per square inch onto the Monel metal, and by diffusion annealing the resulting material at 1700° F. to 1800° F. for about 3 hours under vacuum conditions, the resulting material then being expanded to form the desired mesh. The mesh material was then activated by heating the mesh at a temperature of 1800° F. for 3 hours in air having a water vapor content of about 10 percent, by weight.

These improved catalyst members were then arranged so that gasses comparable to automotive exhaust gasses were passed over the catalyst members at a gas flow rate of 50,000 volumes per volume per hour while the temperature of the gasses were varied and while the free oxygen concentrations of the gasses were varied. That is, the gasses passed over the improved catalyst materials of this invention were made up as follows:

| | |
|---|---|
| Hydrocarbon (n-butane) | 500 p.p.m. |
| Nitrogen oxide (NO) | 1700 p.p.m. |
| Hydrogen ($H_2$) | 0.5 percent (wt.). |
| Carbon monoxide | 1.5 percent (wt.). |
| Carbon dioxide | 11.0 percent (wt.). |
| Water vapor ($H_2O$) | 11.0 percent (wt.). |
| Oxygen ($O_2$) | 0.0, 0.4, 0.8, 1.2 percent (wt.). |
| Nitrogen | Balance. |

Figure 4:
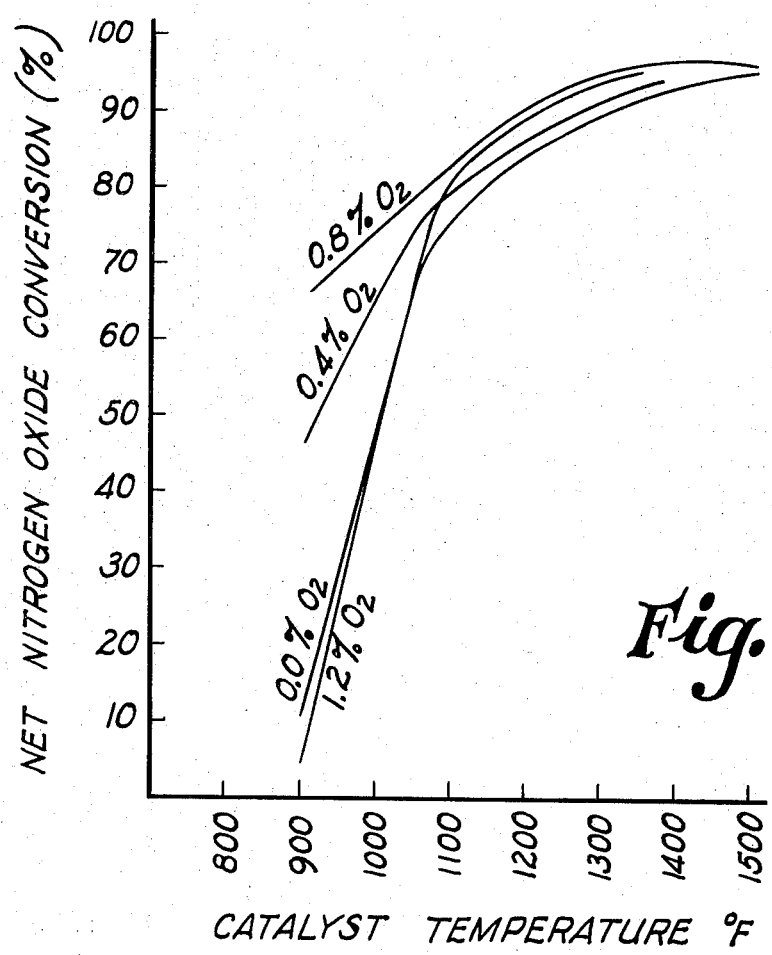
FIG. 4 is a graph illustrating the advantageous properties of the improved catalysts of this invention.

The net efficiency of this improved catalyst was then determined at various temperatures from about 900° F. to about 1500° F., the net efficiency being calculated as the nitrogen oxide input less the nitrogen oxide and ammonia output divided by the nitrogen oxide input and multiplied by 100. The results of these tests are illustrated in the graph of FIG. 4. Thus, as shown in FIG. 4, the improved catalyst of this invention displayed net efficiency of 50 percent at a temperature of about 1000° F. even under the worst oxygen concentration conditions as shown in FIG. 4, the reaching of this level of efficiency at such a low temperature being particularly important for initiating nitrogen oxide removal from exhaust gasses promptly after an automobile engine is started. This 50 percent level of efficiency is reached with the improved catalyst of this invention at a temperature about 200° F. less than when the previously known nickel-copper catalyst was used under similar test conditions. Most important, the improved catalyst of this invention achieved 85 percent net efficiency in removing nitrogen oxides from the exhaust gasses at temperatures as low as about 1175° F. even under the worst oxygen concentration conditions as shown in FIG. 4, this 85 percent efficiency level being about 125° F. lower than the temperature at which the comparable level of efficiency is achieved under similar test conditions using the previously known nickel-copper catalyst material.

Most important, where the improved catalyst of this invention was subjected to the above-noted tests for 140 hours at 1500° F. and then for 80 hours cycling from 1500° F. to 900° F. at 200° F. intervals for one hour at each interval with free oxygen concentrations of 0.0 percent and 0.8 percent, the improved catalyst of this invention was found to display improved net efficiencies in removing nitrogen oxides from the exhaust gasses. Further, the improved catalyst materials were found to retain about 75 percent of their tensile strength and were found to display as much as 7 percent elongation after such testing. The previously known nickel-copper catalyst was found to be too brittle for such elongation testing after only 20 hours in a similar comparison test.

EXAMPLE II

Where similar catalyst materials were prepared by adding similar proportions of lanthanum to a Monel metal base and were activated by a pretreatment process as described in the previous example, these improved catalyst materials were also found to display improved net efficiencies at the noted relatively low temperatures.

EXAMPLE III

Further, where similar catalyst materials were prepared by adding similar proportions of didymium (a mixture of neodymium and praseodymium) to a Monel metal base and where activated by a pretreatment process as above-described, these improved catalyst materials were also found to display improved net efficiencies at the noted relatively low temperatures.

It should be understood that although preferred embodiments of the improved catalysts and processes of this invention have been described above by way of illustrating this invention, the invention includes all modifications and equivalents of the disclosed embodiments falling within the scope of the appended claims.

I claim:

1. An improved catalyst for reducing nitrogen oxides in automotive exhaust gasses, said catalyst comprising a metal alloy having a composition, by weight, of from about 25 to 75 percent nickel, from about 0.5 to 20 percent of a metal catalyst selected from the group consisting of vanadium, lanthanum and didymium, and the balance copper and impurities.

2. An improved catalyst for reducing nitrogen oxides in automotive exhaust gasses, said catalyst comprising a noted alloy having a composition by weight of about 64.3 percent nickel, 31.4 percent copper, 1.48 percent vanadium, 1.22 percent iron, 1.22 percent manganese, and the balance carbon, silicon and other impurities.

3. An improved catalyst member having a surface layer of said catalyst as set forth in claim 2 metallurgically bonded to a supporting layer of a metal backing material, said backing material being of a metal alloy having a composition by weight of about 80 percent nickel and the balance chromium.

References Cited
UNITED STATES PATENTS

| | | | |
|---|---|---|---|
| 3,565,574 | 2/1971 | Kearby et al. | 252—474 X |
| 3,718,733 | 2/1973 | Gehri | 423—213.2 |
| 3,249,427 | 5/1966 | Walp | 75—128 R |
| 2,263,020 | 11/1941 | Trantin | 75—128 R |
| 3,168,397 | 2/1965 | Scharfstein | 75—128 R |
| 3,295,965 | 1/1967 | Willey et al. | 75—128 R |
| 3,773,894 | 11/1973 | Bernstein et al. | 252—474 X |

PATRICK P. GARVIN, Primary Examiner

W. J. SHINE, Assistant Examiner

U.S. Cl. X.R.

252—474; 423—213.2, 213.5